Feb. 7, 1956    W. E. McKIM    2,733,541
RODENT TRAPS
Filed Aug. 13, 1953
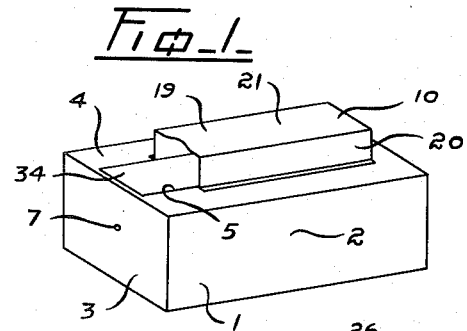
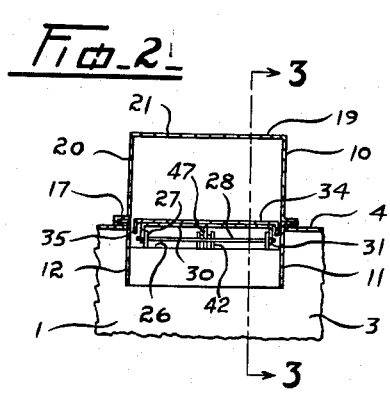
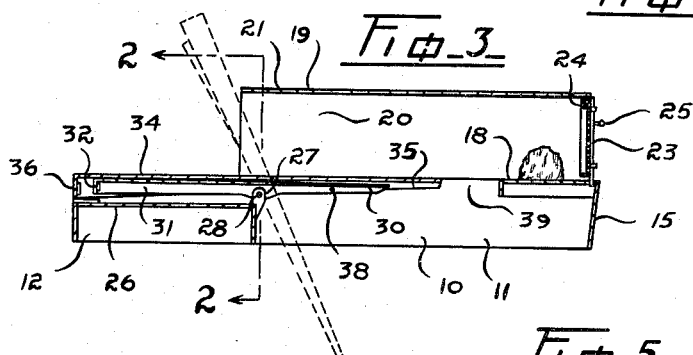
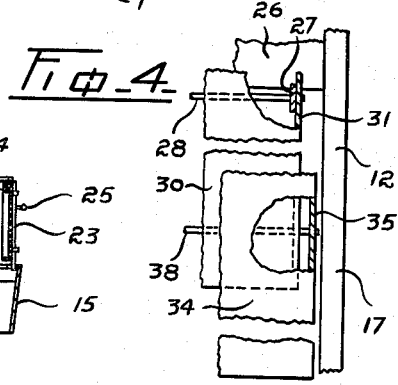
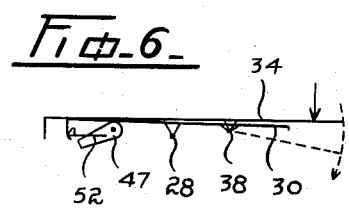
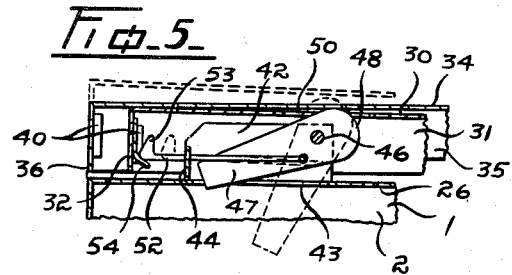
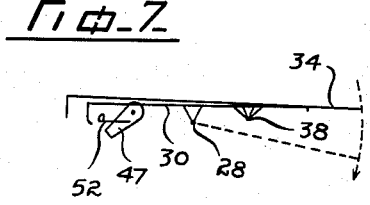
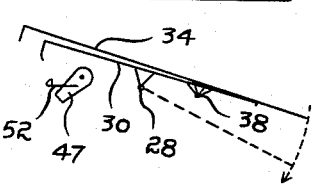
INVENTOR
WALTER E. McKIM
ATTORNEY

United States Patent Office 2,733,541
Patented Feb. 7, 1956

2,733,541
RODENT TRAPS

Walter E. McKim, Vancouver, British Columbia, Canada

Application August 13, 1953, Serial No. 373,997

2 Claims. (Cl. 43—70)

My invention relates to improvements in rodent traps.

The objects of the present invention are to provide a rodent trap having a runway which is rockingly mounted above a water filled container and along which the animal must proceed in an attempt to reach the bait; to provide means for holding the runway in normally horizontal position until such time that the rodent is well beyond the axis of the runway, and to provide means actuated by the weight of the rodent upon the extreme inner end of the runway for releasing said runway to drop the animal into the container. A further object of the invention is to provide a trap which is automatically reset by the return swing of the runway.

Referring to the accompanying drawings:

Figure 1 is a perspective view of the invention.

Figure 2 is a transverse sectional view taken on the line 2—2 of Figure 3.

Figure 3 is a longitudinal sectional view taken on the line 3—3 of Figure 2.

Figure 4 is an enlarged fragmentary plan view showing the disposition of the runway pivot rods.

Figure 5 is an enlarged detail view of the latch.

Figures 6, 7 and 8 are diagrammatic views showing the movements of the runway to release the latch and tilted to discharge position.

In the drawings like characters of reference indicate corresponding parts in each figure.

The numeral 1 indicates a container having side walls 2, end walls 3, and a top wall 4, which top wall is provided with a rectangular opening 5. The container is adapted to be filled with water to a depth determined by an overflow aperture 7 located intermediate the height of one of the end walls 3.

Supported upon the top wall 4 so as to extend into the opening 5 is a trap generally indicated by the numeral 10 and consisting of an open frame 11 having side members 12 and a rear end member 15. The side members 12 are each provided with a short flange 17 which is adapted to bear upon the top wall 4 of the container and the rear end member is suitably inclined to facilitate removal of the trap 10 from the opening 5. Adjacent the member 15 the frame 11 is provided with a bait platform 18 and said frame is fitted with an elongated hood 19, which hood extends over a major portion of the length of the trap and is provided with side walls 20 and a top wall 21. A perforated gate 23 is hingedly mounted as at 24 between the side walls 20 of the hood and is fitted with a suitable latch 25.

The side members 12 of the frame are connected by a medial platform 26 which is provided with a pair of transversely spaced lugs 27 and supported in said lugs is a pivot pin 28. A plate member 30 is rockingly mounted upon the pivot pin 28 and is provided with depending side and end flanges 31 and 32 respectively. Supported upon the plate member is a runway 34 which also has depending side and end flanges numbered 35 and 36 respectively. At a point to the right of the pivot pin 28, as viewed in Figure 3, a pivot rod 38 extends through the respective side flanges 31 and 35 of the plate member and runway and the inner end of said plate member is spaced a short distance below the underside of the runway so that said runway has limited rocking movement about the rod 38 and with respect to the plate member. It will be seen, particularly in Figure 4, that the pivot pin 28 extends through the side flanges 31 only of the plate member but serves as a common axis about which both said plate member and runway may tilt to drop a rodent into the water filled container. The inner end of the runway 34 terminates a short distance from the bait platform 18 to define a gap 39 and either of the end flanges 32 and 36, or both, may be suitably weighted as at 40 to ensure a rapid return of the runway from the fully tilted position shown in dotted line in Figure 3.

Supported upon the platform 26, see Figure 5, is a pair of brackets 42 which are spaced on either side of a longitudinal slot 43 and are connected by an end wall 44. A pin 46 extends between the brackets 42 and a lever 47 is swingingly mounted upon said pin so that its lower end may project through the slot 43. The upper end of the lever 47 is rounded as at 48 and is adapted to project through a slot 50 formed in the member 30 when the rear end of the runway 34 is raised as shown in dotted line in Figure 5. A latch bolt 52 is slidably mounted in the end wall 44 extending through an aperture, not shown, formed therein, which bolt is pivotally secured at one end to the lever 47 and is provided at its opposite end with a rounded head 53 which is adapted to engage a rearwardly curved latch plate 54 secured to the end flange 32 of the plate member 30.

In use, the device operates as shown diagrammatically in Figures 6, 7 and 8 and in the following manner: A rodent senses the bait upon the platform 18 and proceeds along the runway 34 which remains in a horizontal position until the rodent reaches and is confronted by the gap 39. At this point his weight is well beyond the pivot pin 28 and is sufficiently far beyond the rod 38 as to cause the runway to rock slightly, which movement permits the lever 47 to swing to the dotted line position of Figure 5, so as to withdraw the bolt 52 from the latch plate 54. This initial rocking movement of the runway and the subsequent swinging movement of both the runway and plate member occurs almost simultaneously, so that the rodent receives no warning of impending danger and the runway is so over-balanced that its swing is sudden and rapid and the animal has no chance to scramble to safety. As the runway approaches the position shown in dotted line in Figure 3 the rodent slides therefrom into the water and the runway starts its return swing to its original position. By virtue of the relative positions of the pivot pin 28 and the rod 38 this return swing of the runway is made with the outer or weighted end of the member 30 slightly in advance of the corresponding end of the runway 34, see Figure 5. The flange 32 of the member 30 first contacts the platform 26 so that the rounded end 48 of the lever 47 projects through the slot 50 and is contacted by the descending runway. The runway rocks the lever 47 about its pin 46 and thrusts the latch bolt 52 into gripping engagement with the latch plate 54 so that the runway is again latched and ready for the next rodent.

What I claim as my invention is:

1. A rodent trap comprising a horizontal apertured base, a transverse pin supported upon an upper portion of said base, a plate member mounted upon said transverse pin, a runway surmounting said plate member and being pivotally connected thereto adjacent its inner end beyond said transverse pin, said runway being adapted to be rocked by the weight of a rodent upon its inner end, a lever supported upon said base and adapted for rocking movement in a vertical plane, and a latch bolt operatively connected to said lever, said runway, when in normally substantially horizontal position, being adapted to engage the lever and project the latch bolt into latching engagement with an outer end portion of the plate member.

2. A rodent trap comprising a horizontal apertured base, a stationary transverse pin carried on an upper portion of said base, a plate mounted upon said transverse pin, a normally substantially horizontal runway having an entrance end and an inner end, said runway being pivotally mounted on a pivot pin carried by the plate between the transverse pin and the inner end of the runway, said runway having a primary swinging movement in response to the weight of a rodent reaching the inner end of said runway, means for holding the plate from rocking until the inner end of the runway is slightly depressed, and means as said slight depression takes place for releasing the plate holding means whereby the fulcrum of the plate is transferred from the pivot pin to the transverse pin and the plate and the runway are free to swing in unison and in a secondary movement to drop the rodent from the runway, said plate holding means including a lever mounted upon a stationary part of the base, a latch bolt pivotally connected with said lever and adapted to engage a part of the plate, said lever being normally loaded against movement to withdraw the latch bolt by a part of the runway and said lever being freed for movement by the primary swinging movement of the runway.

References Cited in the file of this patent

UNITED STATES PATENTS

| | | |
|---|---|---|
| 765,869 | Wynne | July 26, 1904 |
| 947,250 | Marchand | Jan. 25, 1910 |
| 1,542,673 | Dale | June 16, 1925 |
| 1,798,717 | Baranski | Mar. 31, 1931 |